F. F. SCHWENTKER.
ELECTRIC TIRE VULCANIZER.
APPLICATION FILED APR. 17, 1906.
1,011,860.
Patented Dec. 12, 1911.
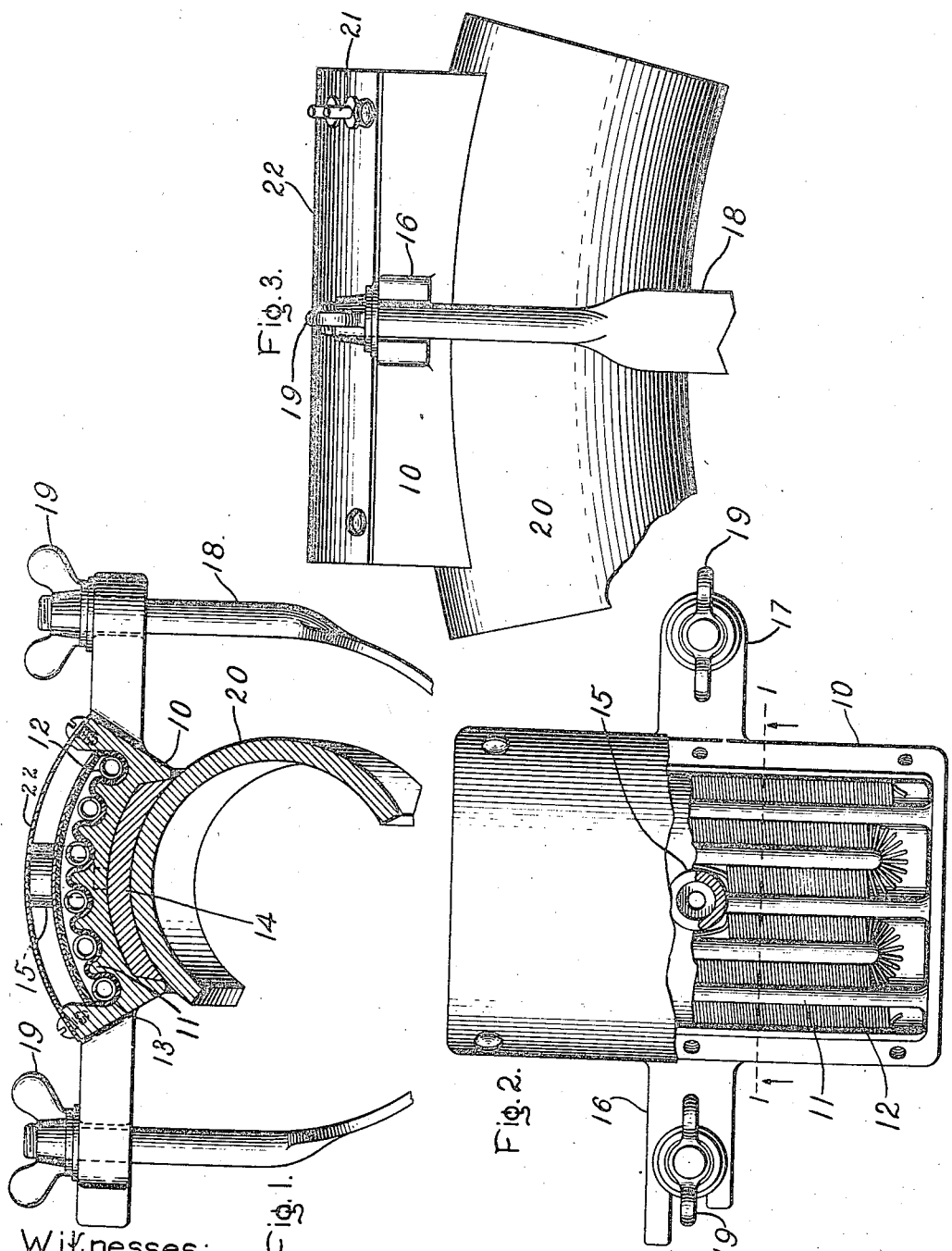
Witnesses:
Burchard V. Kelley
Helen Orford
Inventor:
Frederick F. Schwentker.
by Albert G. Davis
Att'y.

UNITED STATES PATENT OFFICE.

FREDERICK F. SCHWENTKER, OF SCHENECTADY, NEW YORK, ASSIGNOR TO GENERAL ELECTRIC COMPANY, A CORPORATION OF NEW YORK.

ELECTRIC TIRE-VULCANIZER.

1,011,860.　　　　　　Specification of Letters Patent.　　Patented Dec. 12, 1911.

Application filed April 17, 1906. Serial No. 312,119.

*To all whom it may concern:*

Be it known that I, FREDERICK F. SCHWENTKER, a citizen of the United States, residing at Schenectady, in the county of Schenectady, State of New York, have invented certain new and useful Improvements in Electric Tire-Vulcanizers, of which the following is a specification.

This invention relates to electric heaters and has for its object the provision of a device of this character which is so arranged that the shape of its effective heating surface may be varied to adapt it to the outline of objects to which it may be applied, which may be maintained at a constant and safe temperature at minimum expense, which requires no skilled operator and which, at the same time, is thoroughly reliable, efficient and durable.

My invention relates more specifically to heating devices to be used in connection with rubber vulcanizers and finds ready application in the vulcanizing of rubber tires.

It is frequently desirable, especially in the case of automobile tires, to repair a tire by vulcanizing a piece of rubber into it without removing the tire from the wheel. Various devices have been designed for this purpose, all of which have been found objectionable, principally because of the fact that they are usually operated by unskilled hands and the temperature cannot easily be kept at a constantly safe point. Furthermore, they make no provision whereby they may be adapted to various shapes of tires.

In carrying out my invention, I employ a device which is heated electrically and in this way can never exceed a certain predetermined temperature. In order that there may be the most intimate thermal relation between the heater and the tire itself, I provide a "form" which is preferably of cast metal having a surface which is substantially the shape of the tire with which the heater is to be used. The heater is then so arranged that by applying it to the form, molten metal—as for instance, lead or Babbitt's metal—may be poured into a recessed base of the heater, whereby the surface to be heated is given the exact shape of the tire at the point to which the heater is to be applied. The heater is then removed from the form and secured to the tire at the desired position by means of a clamp, and current turned on, there being no necessity for the services of an expert.

In the drawings, in which I have illustrated one embodiment of my invention, Figure 1 is a sectional view of my device taken on the line 1—1 of Fig. 2; Fig. 2 is a plan view, part of the upper casing being removed to show the heating coils; and Fig. 3 is a side elevation of my device.

Referring to the drawings, 10 represents the body of my heating device and may be of any suitable shape or material. I preferably construct it, however, of cast metal—as for instance, cast iron,—in rectangular form. The casting is recessed for about half of its depth and provided with corrugations or ribs 11 running from opposite ends alternately and terminating short of the opposite end. The space between the ribs is sufficient to permit resistance coils 12 to traverse back and forth between them throughout the area of the casting, the coils being insulated from the casting by a layer of insulating material 13. The casting is preferably curved so as to have concentric faces and radial ends. The inner face of the casting is cut away at 14, as shown, so as to allow the recess to be filled with molded material. A perforation 15 is provided at the center of the casting for holding a thermometer, and likewise serves as an opening through which metal may be poured. A pair of arms 16 and 17 extend from opposite sides of the middle of the casting and are adapted to receive a retaining clamp 18 screwed in place by means of the thumb nuts 19.

A form 20, preferably of cast iron, is provided, which is substantially the shape of the tire with which the device is to be used. It is not usually necessary that the form comprise more than a small part of the tire. In the drawings the form is only half section and the length need not be much longer than that of the heater. The terminals of the heating coils are brought to the end of the heater, as at 21, and the coils are covered with a layer of insulation and a sheet metal cover 22.

The operation of my device is as follows: When it is desired to use the heater in connection with automobile tires, the owner is supplied with a form which is of the shape of his tire. The heating device is then applied to the form and metal poured through the opening 15 to fill up the recess. This makes the effective heating surface exactly correspond to the shape of the tire with which it is to be used. The heater is then removed from the form and applied to the tire, being screwed into close contact therewith by means of the thumb nut. The current being turned on, the tire is steadily brought up to the desired temperature, preferably about 270° F., which will be indicated by a thermometer placed in the aperture 15.

It will be seen that no experienced operator is necessary to successfully use my device. By properly designing the heating coils, the heater may be prevented from exceeding a definite safe temperature and the tire will not be injured even though the operator should forget it and allow the heat to be on for a length of time considerably longer than is required to perform the vulcanizing process. It will also be seen that the most intimate thermal relation is established between the tire and the heater and that there are no losses of energy due to lack of contact.

The device is exceedingly cheap, being simply of cast iron and may be enameled on the surface which receives the resistance coils. The forms are also very cheap, and there is nothing about the whole device that can be in any way injured or that requires adjustment or careful handling.

While I have above described my invention as embodied in a specific apparatus and arrangement of parts, it should be of course understood that it is capable of a wide application and may be greatly modified without departing from the spirit of my invention, the scope of which is indicated in the claims annexed hereto.

What I claim as new and desire to secure by Letters Patent of the United States, is:

1. An electric tire vulcanizer comprising a metallic body portion of relatively hard metal, an electric heating unit secured thereto, and a mass of softer metal molded to the body in the shape of a tire and in heat conductive relation with said unit.

2. An electric tire vulcanizer comprising a metallic body portion of relatively hard metal, an electric heating unit secured thereto, a mass of softer metal molded to the body, and a molding form in the shape of a tire for molding the metal to the body.

3. An electric tire vulcanizer comprising a recessed metallic body, an electric heating unit secured thereto in heat conductive relation to the recess, and a molding form in the shape of the tire, the body being provided with a passage for pouring soft metal into the recess against the surface of the form.

4. An electric tire vulcanizer comprising a metallic body portion of relatively hard metal, an electric heating unit secured thereto, a mass of softer metal molded to the body in the shape of a tire and in heat conductive relation with said unit, and a clamping device for holding the soft metal against the tire.

In witness whereof, I have hereunto set my hand this 16th day of April, 1906.

FREDERICK F. SCHWENTKER.

Witnesses:
B. B. HULL,
HELEN ORFORD.